(12) United States Patent
Jerger et al.

(10) Patent No.: US 9,631,537 B2
(45) Date of Patent: Apr. 25, 2017

(54) SYSTEM FOR CONCENTRATING EXHAUST GAS FLOW IN A CATALYST DURING COLD STARTS

(71) Applicants: Robert J Jerger, Dexter, MI (US); James J Daley, Jackson, MI (US); Joseph M Dekar, Jackson, MI (US); Andrew Brocker, Brighton, MI (US); Wei-Jun Yang, Ann Arbor, MI (US); Xuefei Chen, Novi, MI (US); Brett Schubring, Macomb, MI (US); Lydell S Powell, West Bloomfield, MI (US)

(72) Inventors: Robert J Jerger, Dexter, MI (US); James J Daley, Jackson, MI (US); Joseph M Dekar, Jackson, MI (US); Andrew Brocker, Brighton, MI (US); Wei-Jun Yang, Ann Arbor, MI (US); Xuefei Chen, Novi, MI (US); Brett Schubring, Macomb, MI (US); Lydell S Powell, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 141 days.

(21) Appl. No.: 14/547,194

(22) Filed: Nov. 19, 2014

(65) Prior Publication Data

US 2016/0138453 A1 May 19, 2016

(51) Int. Cl.
*B01D 50/00* (2006.01)
*F01N 3/20* (2006.01)
(Continued)

(52) U.S. Cl.
CPC ....... *F01N 3/2066* (2013.01); *B01D 53/9454* (2013.01); *B01D 53/9495* (2013.01);
(Continued)

(58) Field of Classification Search
CPC ...... F01N 3/0842; F01N 3/103; F01N 3/2006; F01N 3/2066; F01N 2470/24; B01D 53/9495
(Continued)

(56) References Cited

U.S. PATENT DOCUMENTS 5,647,203 A   7/1997   Abe et al.
6,162,403 A * 12/2000  Foster ................... F01N 13/146
                                                        422/173
(Continued)

*Primary Examiner* — Tom P Duong
(74) *Attorney, Agent, or Firm* — Ralph E. Smith

(57) ABSTRACT

An exhaust gas flow concentration system for a catalyst includes an inlet that receives a flow of exhaust gas from an exhaust pipe of an exhaust system, a stationary tube in communication with the inlet and disposed upstream from the catalyst, and an extension tube in communication with the stationary tube and disposed upstream from the catalyst, where the extension tube includes a cross-sectional area less than a cross-sectional area of the catalyst. A displacement device is coupled to the extension tube and is configured to (i) displace the extension tube relative to the stationary tube downstream towards the catalyst as a temperature in the exhaust system decreases away from a light-off temperature of the catalyst and (ii) retract the extension tube relative to the stationary tube upstream away from the catalyst when the temperature in the exhaust system reaches the light-off temperature of the catalyst.

12 Claims, 4 Drawing Sheets

(51) Int. Cl.
*B01D 53/94* (2006.01)
*F01N 3/10* (2006.01)
*F01N 3/28* (2006.01)
*F01N 9/00* (2006.01)
*F01N 13/08* (2010.01)
*F01N 3/08* (2006.01)

(52) U.S. Cl.
CPC .............. *F01N 3/101* (2013.01); *F01N 3/103* (2013.01); *F01N 3/2006* (2013.01); *F01N 3/2892* (2013.01); *F01N 9/00* (2013.01); *F01N 13/08* (2013.01); *F01N 3/0842* (2013.01); *F01N 2470/24* (2013.01); *F01N 2900/1626* (2013.01); *Y02T 10/22* (2013.01); *Y02T 10/24* (2013.01); *Y02T 10/26* (2013.01); *Y02T 10/47* (2013.01)

(58) Field of Classification Search
USPC ......................................... 422/175, 176, 179
See application file for complete search history.

(56) References Cited

U.S. PATENT DOCUMENTS

| | | |
|---|---|---|
| 7,722,827 B2 | 5/2010 | Fischer et al. |
| 8,361,423 B2 | 1/2013 | Chivilikhin et al. |
| 8,434,692 B2 | 5/2013 | Scott et al. |

\* cited by examiner

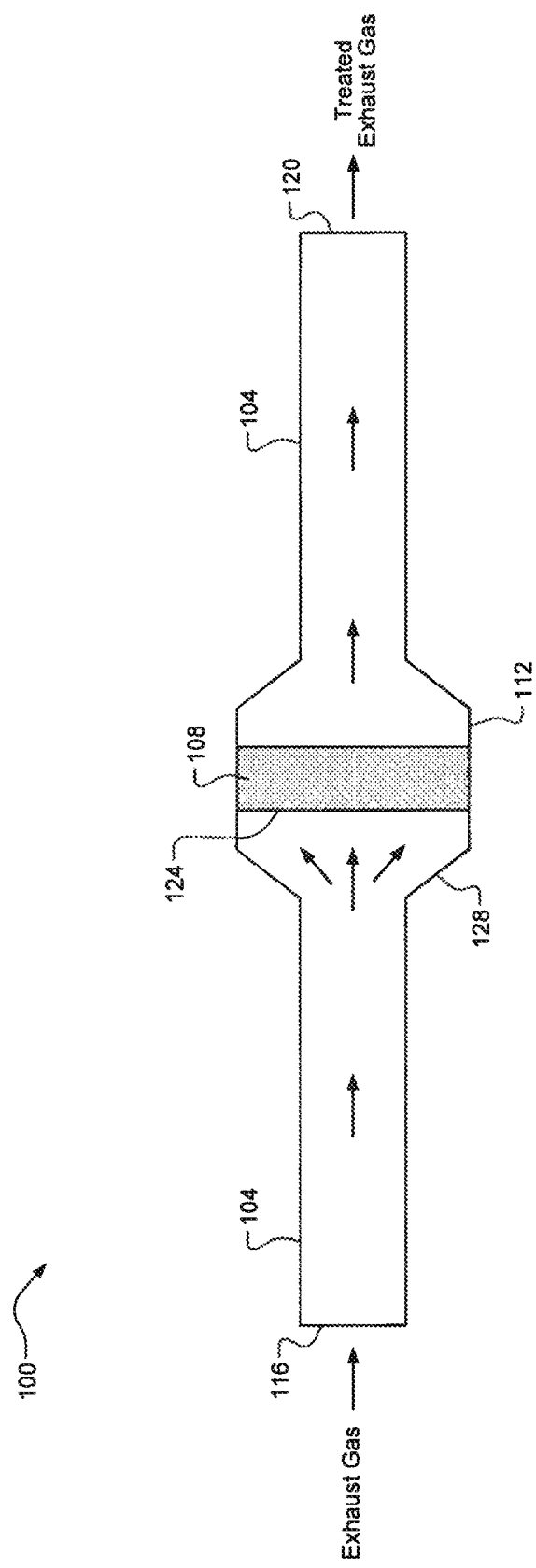

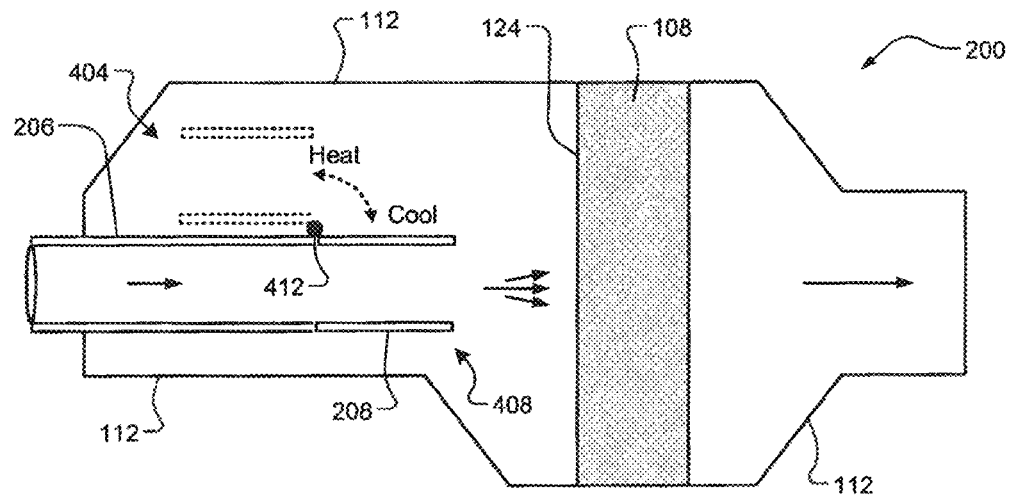
Figure 4A
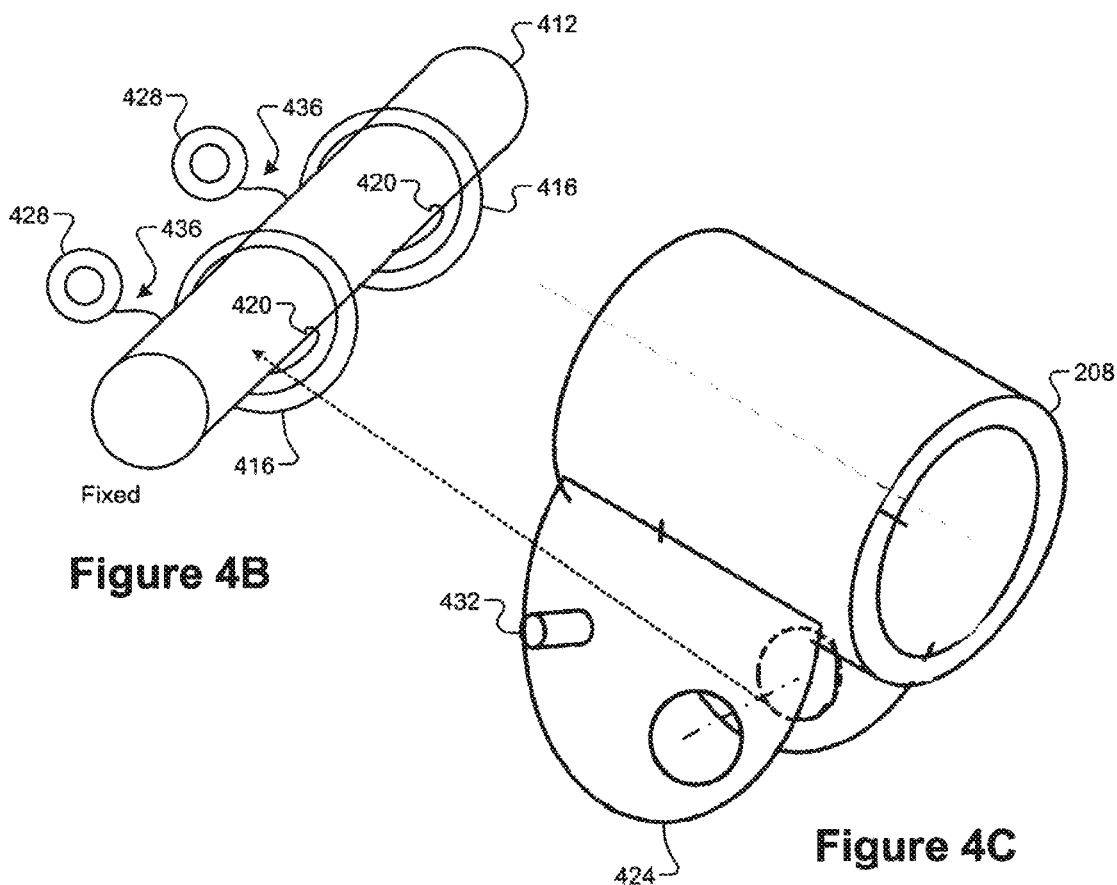
Figure 4B
Figure 4C

SYSTEM FOR CONCENTRATING EXHAUST GAS FLOW IN A CATALYST DURING COLD STARTS

FIELD

The present application relates generally to vehicle exhaust systems and, more particularly, to systems for concentrating exhaust gas flow onto a catalyst during cold starts.

BACKGROUND

Vehicle engines combust a mixture of air and fuel within cylinders to drive pistons and generate drive torque. Exhaust gas resulting from this combustion is then treated by an exhaust system. One or more catalysts (e.g., a three-way catalytic converter) in the exhaust system react with the exhaust gas to decrease or eliminate emissions (nitrogen oxides, carbon monoxide, hydrocarbons, etc.) released into the atmosphere. Each catalyst has a light-off period during which the catalyst heats up via the exhaust gas flowing through it. This light-off period lasts until the catalyst reaches a temperature threshold at which the catalyst can react with the exhaust gas. Therefore, longer light-off periods result in increased emissions, particularly after a cold start. Additional precious metals can be added to the catalyst to improve its performance, but this increases costs. Thus, while such exhaust system catalysts work for their intended purpose, there remains a need for improvement in the relevant art.

SUMMARY

In accordance with an aspect of the invention, an exhaust gas flow concentration system for a catalyst is provided. In one exemplary implementation, the exhaust gas flow concentration system includes an inlet that receives a flow of exhaust gas from an exhaust pipe of an exhaust system, a stationary tube in communication with the inlet and disposed upstream from the catalyst, an extension tube in communication with the stationary tube and disposed upstream from the catalyst, the extension tube having a cross-sectional area less than a cross-sectional area of the catalyst, and a displacement device coupled to the extension tube and configured to (i) displace the extension tube relative to the stationary tube downstream towards the catalyst as a temperature in the exhaust system decreases away from a light-off temperature of the catalyst and (ii) retract the extension tube relative to the stationary tube upstream away from the catalyst when the temperature in the exhaust system reaches the light-off temperature of the catalyst.

In some embodiments, a maximum downstream displacement of the extension tube towards the catalyst corresponds to a cold start temperature of the catalyst. In some embodiments, the displacement device is configured to retract the extension tube upstream away from the catalyst as the temperature in the exhaust system increases from the cold start temperature to the light-off temperature, and a maximum upstream retraction or zero downstream displacement position of the extension tube corresponds to the light-off temperature.

In some embodiments, the displacement device includes at least one bimetal device configured to displace and retract the extension tube. In some embodiments, each bimetal device includes two metals having different thermal expansion and contraction properties. In one embodiment, the two metals are steel and brass. In some embodiments, each bimetal device is configured to expand towards the catalyst or retract away from the catalyst in response to a change in the temperature in the exhaust system. In one embodiment, each bimetal device is a bimetal coil spring or bimetal wishbone link device. In another embodiment, each bimetal device is a bimetal leaf spring.

In some embodiments, at least one bimetal device is arranged between the extension tube and a stationary tube. In one embodiment, the tubes are circular or rectangular. In some embodiments, the stationary tube defines at least one aperture configured for thermal communication between an interior of the stationary tube and at least one bimetal device. In some embodiments, the system includes at least one carbon scraper coupled to an end edge of the stationary tube nearest the catalyst, the carbon scraper being configured to scrape carbon deposits from an inner wall of the stationary tube.

In some embodiments, the displacement device includes an electric motor-based displacement system configured to displace and retract the extension tube. In some embodiments, the displacement device includes a vacuum-based displacement system configured to displace and retract the extension tube. In one embodiment, the vacuum-based displacement system is configured to utilize another vacuum source of a vehicle comprising the exhaust gas flow concentration system.

In some embodiments, the displacement device includes a fixed shaft coupled to the extension tube and configured to rotate the extension tube between a retracted position and an extended position aligned with the stationary tube. In some embodiments, the displacement device further comprises dual flat helical bimetal springs coupled to the fixed shaft and the extension tube and configured to rotate the extension tube between the extended and retracted positions based on a temperature of the exhaust gas.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is an example cross-sectional diagram of an exhaust system for a vehicle engine according to the principles of the present disclosure;

FIGS. 4A-4C are example diagrams of an exhaust gas flow concentration system according to the principles of the present disclosure.

DESCRIPTION

Figure 2A:
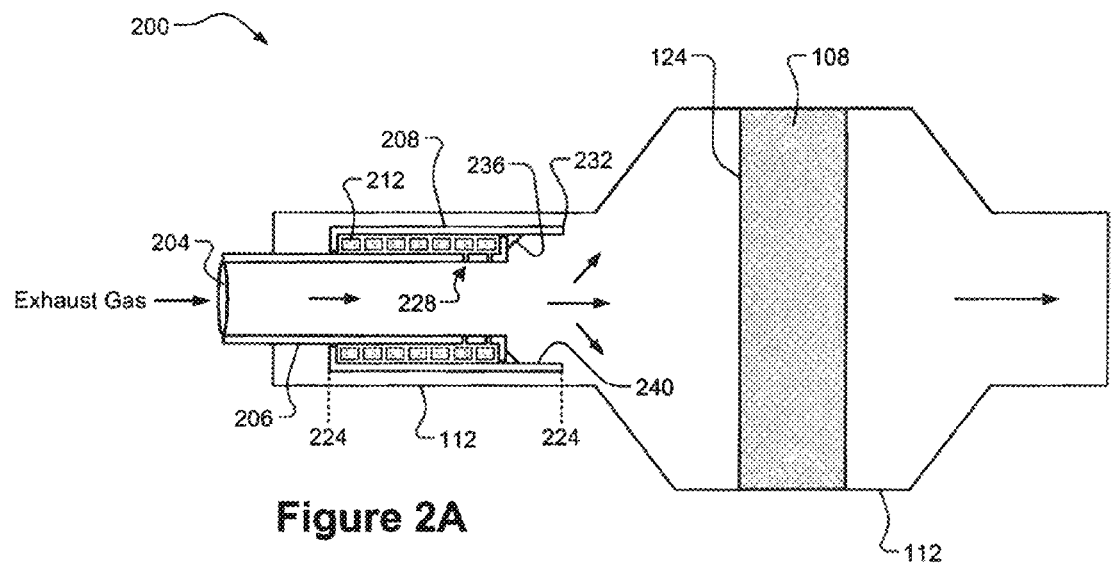
FIGS. 2A-2B are example cross-sectional diagrams of an exhaust gas flow concentration system according to the principles of the present disclosure.

As previously discussed, there remains a need for improvement in the art of exhaust system catalysts. Accordingly, exhaust gas flow concentration systems are presented. These systems concentrate the exhaust gas flow onto a catalyst during cold starts and/or temperatures of the catalyst less than a light-off temperature. In one exemplary implementation, the systems comprise an extension tube that is longitudinally displaced to concentrate the exhaust gas flow on only a portion of a face or front surface of a catalyst during cold starts. In one exemplary embodiment, this displacement is controlled by bi-metal devices, such as bimetal coil or leaf springs, which expand when cold to displace the extension tube and contract when heated to retract the extension tube. In another exemplary embodiment, this displacement is controlled by another displacement system, such an electric motor-based system or a vacuum-based system. Potential benefits of these systems include faster catalyst light-off, decreased emissions, and/or decreased costs by using less precious metal for the catalyst. Additionally, the stationary/extension tube and displacement device configuration disclosed herein does not impede the flow of exhaust gas through the exhaust system, such as by narrowing the exhaust flow passage at/near the catalyst, which could decrease vehicle or exhaust system performance, and could potentially damage other components.

Referring now to FIG. 1, an example cross-sectional diagram of an exhaust system 100 is illustrated. The exhaust system 100 is configured to receive and treat exhaust gas produced by an engine (not shown). For example, the engine could be an internal combustion engine of a vehicle. The exhaust system 100 can include an exhaust pipe 104 and a catalyst 108. In one exemplary embodiment, the catalyst 108 is disposed within a housing 112. In one exemplary implementation, the housing 112 defines a cone-shape expansion 128 from the exhaust pipe 104 to the catalyst 108. The exhaust pipe 104 defines an inlet 116 that receives the exhaust gas and an outlet 120 that releases the treated exhaust gas into the atmosphere. It will be appreciated that while one catalyst 108 is shown, the exhaust system 100 could include a plurality of catalysts (an oxidation catalyst, a selective catalytic reduction (SCR) catalyst, a three-way catalyst (TWC) or catalytic converter, etc.). In one exemplary implementation, the catalyst 108 is a TWC or is part of a catalytic converter configured to treat the exhaust gas to decrease carbon monoxide (CO), hydrocarbons (HC), and nitrogen oxides (NOx). In one exemplary implementation, the housing 112 forms or is part of a catalytic converter coupled to the exhaust pipe 104.

The catalyst 108 is at least partially porous and allows for the flow of exhaust gas therethrough. The catalyst 108 has a face or front surface 124 that first interacts with the exhaust gas. An area of this front surface 124 is also referred to as a cross-sectional area of the catalyst 108. The flow of the exhaust gas through the catalyst 108 increases a temperature of the catalyst 108. Once the temperature of the catalyst 108 reaches a light-off temperature, the catalyst 108 begins to react with the exhaust gas to decrease CO, HC, and/or NOx. For example, these gases could be converted to carbon dioxide ($CO_2$) and/or water ($H_2O$). In some implementations and as shown, the cross-sectional area of the catalyst 108 is substantially greater than a cross-sectional area of the exhaust pipe 104. While this difference provides for high exhaust back pressure and a larger reactive surface area of the catalyst 108, the light-off time or period of the catalyst 108 is increased because the exhaust gas disperses and heats the entire surface 124 of the catalyst 108.

Figure 2B:
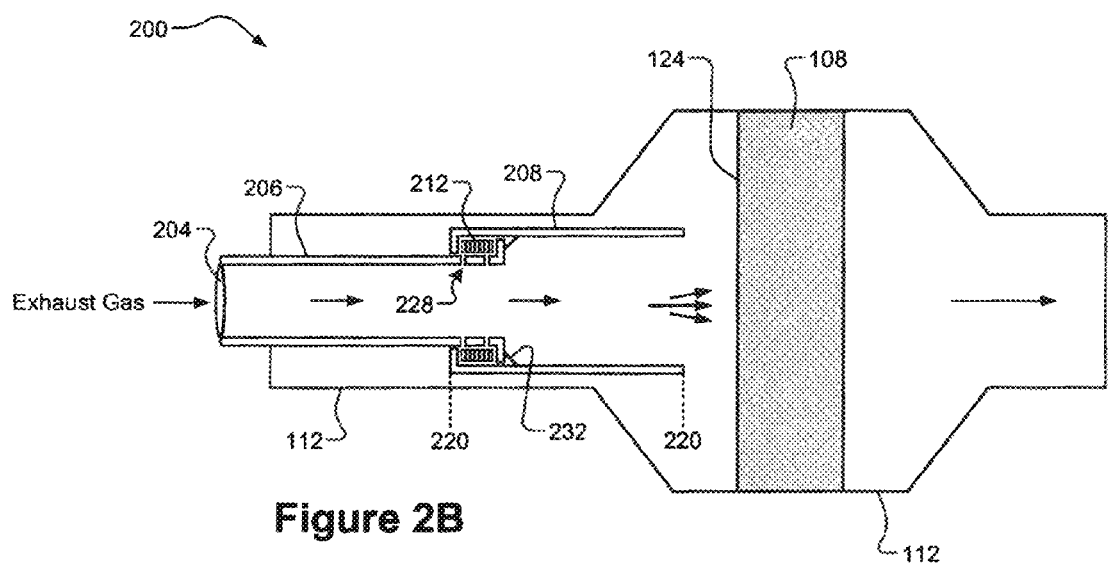

Referring now to FIGS. 2A-2B, example cross-sectional diagrams of an exhaust gas flow concentration system 200 are illustrated. The system 200 includes an inlet 204, a stationary tube 206, an extension tube 208, and a displacement device 212. While a single displacement device 212 is discussed herein, it will be appreciated that the displacement device 212 could comprise a plurality of components or elements, such as a plurality of bimetal devices. In one exemplary implementation, the inlet 204 is narrower than the exhaust pipe 104, although it will be appreciated that the inlet 204 could be the same size as the exhaust pipe 104 and the housing 112 could have a larger portion surrounding the inlet 204. It will be appreciated that the stationary tube 206 could be the exhaust pipe 104 or a separate tube in communication with the exhaust pipe 104 via the inlet 204.

The inlet 204 is configured to receive the exhaust gas flowing through the exhaust system 100 and is in communication with the stationary tube 206. The extension tube 208 is in communication with the stationary tube 206. Both tubes 206, 208 are disposed upstream from the catalyst 108 and have a lesser cross-sectional area than the catalyst 108. In one exemplary embodiment, the extension tube 208 has a larger cross-sectional area than the stationary tube 206. Both tubes 206, 208 could be circular or rectangular, but it will be appreciated that other suitable configurations could be used, such as an elliptical configuration.

The displacement device 212 is configured to displace the extension tube 208 downstream towards the catalyst 108 (FIG. 2B) during cold starts and retract the extension tube 208 upstream away from the catalyst 108 (FIG. 2A) when the exhaust gas temperature reaches the light-off temperature of the catalyst 108. The displacement of the extension tube 208 towards the catalyst 108 concentrates the flow of the exhaust gas on only a portion of the front surface 124 of the catalyst 108. By concentrating the exhaust gas flow on less than the entire cross-sectional area of the catalyst 108, the catalyst 108 is heated to its light-off temperature faster, thus decreasing the light-off time or period. By decreasing the light-off period of the catalyst 108, the chemical reaction is able to begin sooner, thereby decreasing emissions. Additionally or alternatively, less precious metal could be used in the catalyst 108, thereby decreasing costs. Examples of these precious metals that form a core of the catalyst 108 include platinum, palladium, rhodium, cerium, iron, manganese, and nickel. In some embodiments, the catalyst 108 could also be washcoated.

Figure 3A:
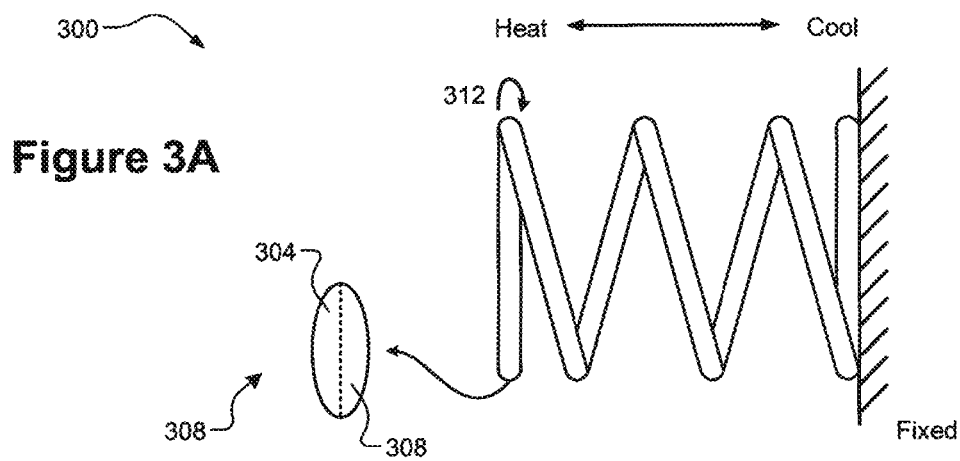
FIGS. 3A-3C are example diagrams of various bimetal device configurations according to the principles of the present disclosure.
Figure 3B:
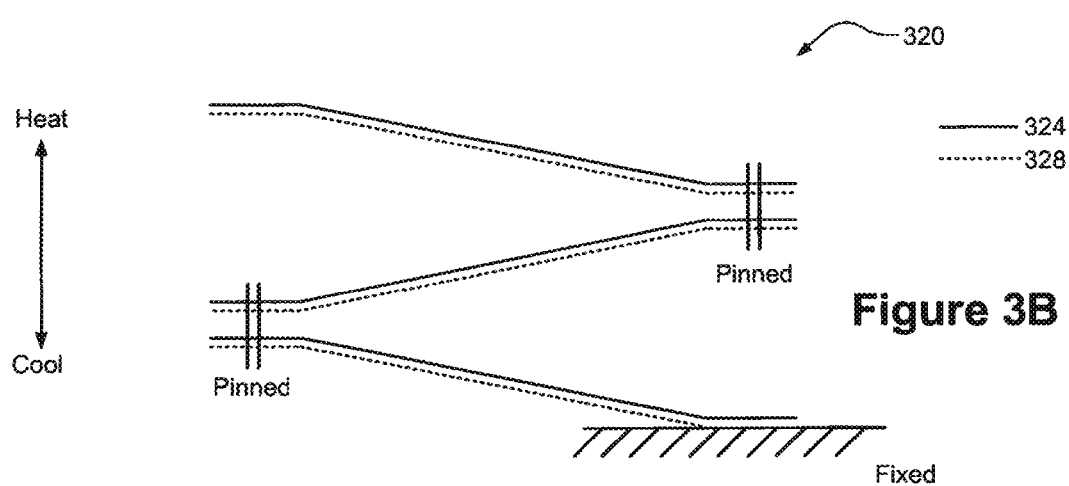
Figure 3C:
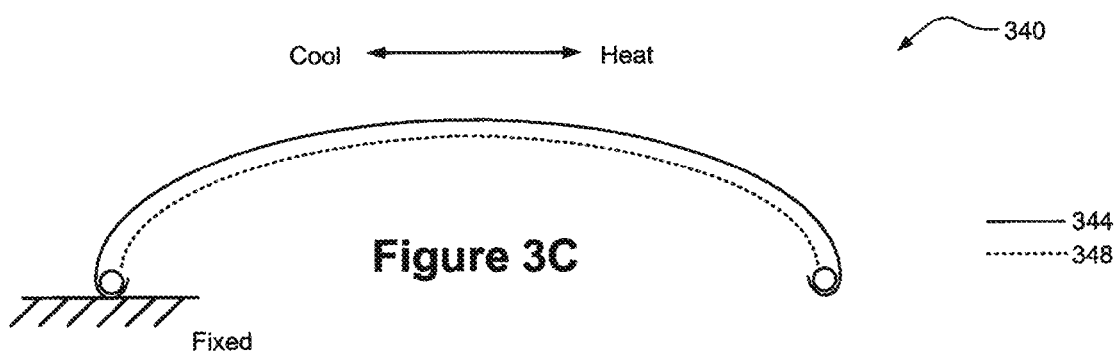

In one exemplary implementation, the displacement device 212 includes at least one bimetal device comprising two metals having different thermal expansion/contraction properties. For example only, the two metals could be steel and brass. Example configurations of the bimetal device are illustrated in FIGS. 3A-3C. FIG. 3A illustrates a bimetal coil spring 300 comprising two metals 304, 308 (see cross-section 312) having different thermal expansion/contraction properties. The bimetal coil spring 300 also has a twist angle 312 (e.g., 5+ degrees). FIG. 3B illustrates a bimetal wishbone link 320 comprising two distinct metals 324, 328 having different thermal expansion/contraction properties. FIG. 3C illustrates a bimetal leaf spring 340 comprising two distinct metals 344, 348 having different thermal expansion/contraction properties. Each of these bimetal device configurations 300, 320, 340 are configured to contract when cold and to expand when heated. The specific spring rates and displacements of the bimetal device configurations 300, 320, 340 could be controlled based on the thermal expansion/contraction parameters of the corresponding metals 304/308, 324/328, and 344/348 respectively, and/or other design parameters (material thickness, twist angle, etc.). In one exemplary implementation, for example, an optimal twist angle 312 for the bimetal coil spring 300 could minimize diameter growth and maximize height growth in response to heating from the exhaust gas.

For a bimetal device-based displacement device 212, the extension tube 208 is displaced towards the catalyst 108 when the exhaust gas temperature is less than the light-off temperature of the catalyst 108. Similarly, the extension tube 208 is then retracted away from the catalyst 108 when the exhaust gas temperature approaches and finally reaches the light-off temperature of the catalyst 108. Thus, in one exemplary implementation, a maximum downstream displacement position 220 of the extension tube 208 towards the catalyst 108 could correspond to a cold start temperature, and a maximum upstream retraction or zero downstream displacement position 224 of the extension tube 208 could corresponds to the light-off temperature of the catalyst 108. For exhaust gas temperatures greater than the cold start temperature and less than the light-off temperature of the catalyst 108, the extension tube 208 could be partially displaced downstream towards the catalyst 108.

In one exemplary implementation, the stationary tube 206 defines apertures 228 that provide for thermal communication between its interior and a portion of the extension tube 208 housing or associated with the displacement device 212 (e.g., the bimetal device(s)). For example, this thermal communication could be beneficial to actuate bi-metal device(s) disposed in the portion of the extension tube 208, such as a void between the tubes 206, 208. For other non-thermally activated implementations of the displacement device 212, the stationary tube 206 could define no apertures 228. In one exemplary implementation, the system 200 further includes at least one carbon scraper 236 coupled to an end edge 232 of the stationary tube 206 that is nearest the catalyst 108. Each carbon scraper 236 is configured to scrape carbon deposits or other exhaust gas deposits from an inner wall 240 of the extension tube 208.

While a bi-metal device-based displacement device 212 is discussed above, other suitable systems can be implemented for the displacement device 212. In another exemplary implementation, the displacement device 212 comprises an electric motor-based displacement system configured to displace and retract the extension tube 208. In yet another exemplary implementation, the displacement device 212 comprises a vacuum-based displacement system configured to displace and retract the extension tube 208. For example only, the vacuum-based displacement system could be configured to utilize another vacuum or low/negative pressure source of a vehicle comprising the exhaust gas flow concentration system. Both the electric motor-based displacement system and the vacuum-based displacement system could further comprise any suitable mechanical linkage in communication with the electric motor or vacuum system and configured to physically displace/retract the extension tube 208.

Referring now to FIGS. 4A-4C, another exemplary embodiment of the exhaust gas flow concentration system 200 is illustrated. In this embodiment, the extension tube 208 is coupled to a fixed shaft 412 aligned perpendicular to or generally perpendicular to the extension tube 208. The fixed shaft 412 is configured such that the extension tube 208 is rotatable between a retracted position 404 and an extended position 408. In the retracted position 404, the extension tube 208 does not concentrate the flow of exhaust gas onto the catalyst 108. In the extended position 408, however, the extension tube 208 is aligned with the stationary tube 206, thereby concentrating the flow of exhaust gas onto the catalyst 108.

FIGS. 4B-4C illustrate an exemplary embodiment for controlling the rotation of the extension tube 208 about the fixed shaft 412 using dual flat helical bimetal springs 416 coupled to the fixed shaft 412 at 420. The extension tube 208 is coupled to ears 424 at 428, and pins 432 on the ears 424 are coupled to the bimetal springs 416 at 436. A change in temperature of the exhaust gas causes rotational displacement of the extension tube 208 about the fixed shaft 412 via the ears/pins 424/432 and the bimetal springs 416. When cooled, the bimetal springs 416 rotate the extension tube 208 towards the extended position 408. When heated, on the other hand, the bimetal springs 416 rotate the extension tube 208 towards the retracted position 404.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An exhaust gas flow concentration system for a catalyst, the exhaust gas flow concentration system comprising:
   an inlet that receives a flow of exhaust gas from an exhaust pipe of an exhaust system;
   a stationary tube in communication with the inlet and disposed upstream from the catalyst;
   an extension tube in communication with the stationary tube and disposed upstream from the catalyst, the extension tube having a cross-sectional area less than a cross-sectional area of the catalyst; and
   a displacement device coupled to the extension tube and configured to:
   (i) displace the extension tube relative to the stationary tube downstream towards the catalyst as a temperature in the exhaust system decreases away from a light-off temperature of the catalyst; and
   (ii) retract the extension tube relative to the stationary tube upstream away from the catalyst when the temperature in the exhaust system reaches the light-off temperature of the catalyst,
   wherein the displacement device comprises at least one bimetal device configured to displace and retract the extension tube.

2. The exhaust gas flow concentration system of claim 1, wherein a maximum downstream displacement position of the extension tube towards the catalyst corresponds to a cold start temperature of the catalyst.

3. The exhaust gas flow concentration system of claim 1, wherein the displacement device is configured to retract the extension tube upstream away from the catalyst as the temperature in the exhaust system increases from the cold start temperature to the light-off temperature, and wherein a maximum upstream retraction or zero downstream displacement position of the extension tube corresponds to the light-off temperature.

4. The exhaust gas flow concentration system of claim 1, wherein each bimetal device is configured to expand towards the catalyst or retract away from the catalyst in response to a change in the temperature in the exhaust system.

5. The exhaust gas flow concentration system of claim 4, wherein the at least one bimetal device is between the stationary tube and the extension tube.

6. The exhaust gas flow concentration system of claim 5, wherein the stationary tube defines at least one aperture configured for thermal communication between an interior of the stationary tube and the at least one bimetal device.

7. The exhaust gas flow concentration system of claim 5, wherein each bimetal device is a bimetal coil spring or bimetal wishbone link device.

8. The exhaust gas flow concentration system of claim 5, wherein each bimetal device is a bimetal leaf spring.

9. The exhaust gas flow concentration system of claim 5, further comprising at least one carbon scraper coupled to an end edge of the stationary tube nearest the catalyst, the carbon scraper being configured to scrape carbon deposits from an inner wall of the extension tube.

10. The exhaust gas flow concentration system of claim 1, wherein each bimetal device comprises two metals having different thermal expansion and contraction properties.

11. The exhaust gas flow concentration system of claim 10, wherein the two metals comprise steel and brass.

12. The exhaust gas flow concentration system of claim 1, wherein the stationary and extension tubes are circular or rectangular.

* * * * *